June 26, 1956   R. B. FROST   2,752,174
HINGED PIPE COUPLING AND METHOD OF MAKING THE SAME
Filed June 16, 1953
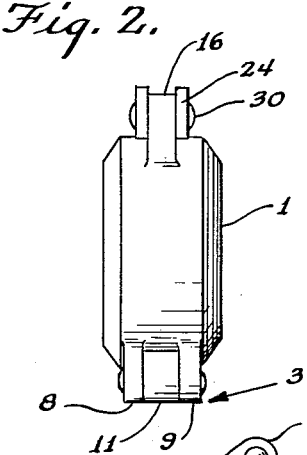
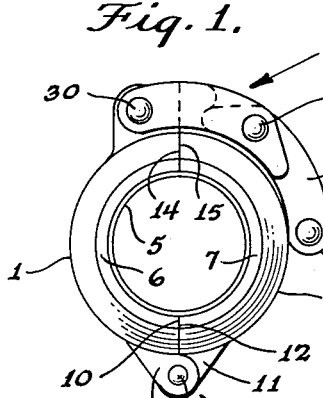
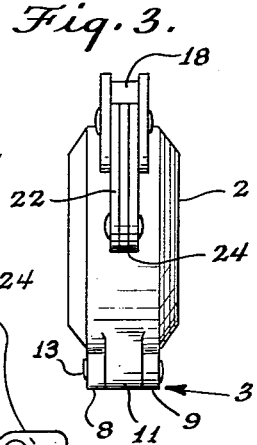
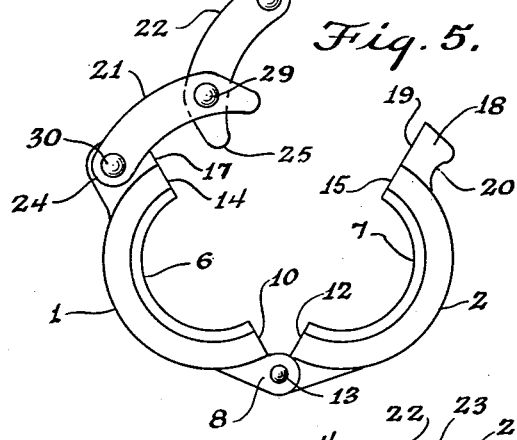
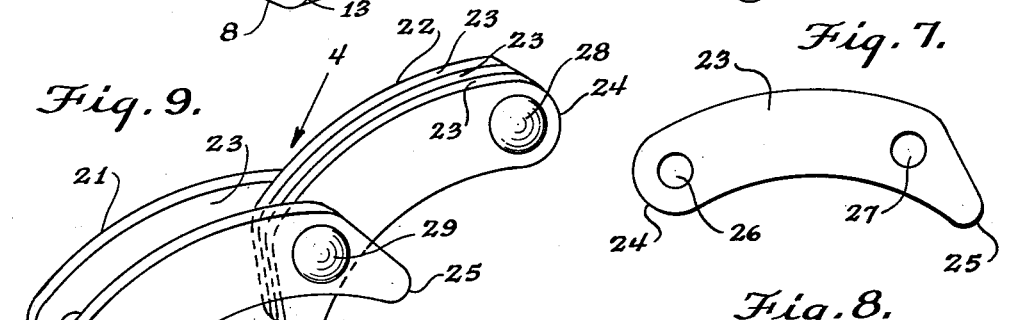
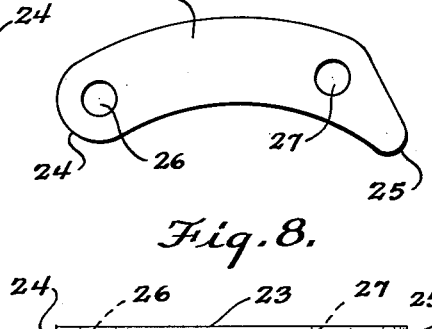
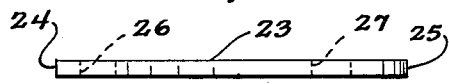
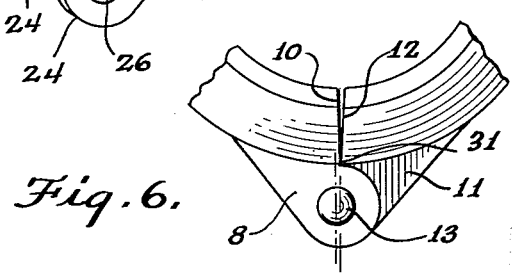
INVENTOR.
RAYMOND B. FROST
BY
Albert M. Parker
ATTORNEY.

United States Patent Office 2,752,174
Patented June 26, 1956

2,752,174
HINGED PIPE COUPLING AND METHOD OF MAKING THE SAME

Raymond B. Frost, Springfield, N. J., assignor to Victaulic Company of America, Union, N. J., a corporation of New Jersey Application June 16, 1953, Serial No. 361,935

6 Claims. (Cl. 285—194)

This invention relates to pipe coupling and method of making the same, and, in particular, to such couplings for quickly but strongly coupling and uncoupling pipe sections to be joined, to methods of making such couplings and parts thereof.

The couplings with which this invention is concerned are of the type employed for the forming of tight accurately aligned joints between ends of sections of plain end pipe. Furthermore, these couplings are of the type which employ pressure responsive gaskets overlying the joint, which gaskets are received within coupling housings having key sections for reception within grooves formed in the pipe.

Normally such couplings employ two housing sections which are applied by being bolted together, with the gasket and pipe ends therewithin. This normal manner of application is obviously time consuming though that is not too serious a matter where the pipe line, or piping system, being laid is to be a relatively permanent one. Where, however, the quick coupling and/or quick uncoupling of pipe joints is desired, such as where pipe lines are laid on a more or less temporary basis and are taken up or moved at relatively frequent intervals, applying the couplings by bolting the housings together presents a serious obstacle.

Some efforts to provide couplings capable of being quickly applied and quickly removed have heretofore been made, but the resultant constructions have generally been too complicated, and expensive, without countervailing advantages, to bring them into widespread use. The coupling of the invention eliminates these and other drawbacks of the prior art constructions and in addition involves methods of forming couplings and parts thereof which go far beyond anything contemplated by the prior art, while introducing improvements, economies and simplification into the art.

It is, accordingly, the principal object of this invention to provide for the quick coupling and uncoupling of pipe ends being joined.

Another object is to provide methods for forming coupling devices and parts thereof for use in the quick coupling and uncoupling of pipe ends being joined.

Another object is to provide readily applicable and removable pipe couplings which strongly resist displacement by line pressure.

Still another object is to provide readily applicable and removable pipe couplings which are easy to manipulate and are highly effective in operation though of simple and economical construction.

A further object is to provide such couplings which, though quickly applicable may, if desired, serve for permanent installation.

More detailed objects are to provide simplified toggle mechanisms for actuating pipe couplings and to incorporate a strong self tensioning action in the coupling assembly.

Further and more specific objects of the invention will in part be obvious and in part be pointed out as the description of the invention taken in conjunction with the accompanying drawing proceeds.

In that drawing:

Figure 1 is a front elevation of a coupling device in accordance with the invention shown in closed position.

Figure 2 is a side elevation of the construction shown in Figure 1 as viewed from the left.

Figure 3 is a side elevation thereof as viewed from the right.

Figure 4 is a view similar to Figure 1 showing the toggle engaged but prior to full closing of the coupling.

Figure 5 is a view similar to Figure 4 showing the toggle disengaged and the coupling opened a substantial distance further.

Figure 6 is an enlarged fragmentary elevation of portions of the coupling housings including the hinge joining those housings.

Figure 7 is a plan view of one of the toggle elements in accordance with the invention.

Figure 8 is a front elevation of the element of Figure 7 as viewed from the underneath thereof; and Figure 9 is a perspective view of the assembly of toggle elements in accordance with the invention.

The coupling device of the invention employs, and is formed to receive, an annular, hollow, pressure-responsive gasket of the general type illustrated in Tribe Patent No. 1,541,601. The housings making up the coupling device of the invention are also formed to engage grooves in the outer surfaces of the pipe sections being coupled. Since these features are known to those skilled in the art, no particular illustration of them is deemed necessary for an understanding of the instant invention.

The coupling device of the invention (hereinafter merely referred to as the "coupling") consists of two generally hemi-cylindrical housings, 1 and 2, which are hinged together at 3 and are secured in closed position by a toggle member, generally indicated at 4. Each of the housings 1 and 2 is formed with an internal hemi-cylindrical channel for reception of the hollow pressure responsive gasket, one of whose lips is indicated at 5 in Figure 1. Showing of such gasket has been omitted from the other figures for clarity of illustration. At each side of their gasket receiving channels the housings 1 and 2 are bordered by key sections 6 and 7 which engage grooves formed in the outer surface of the pipes being coupled. The housings, these key sections, and the other elements of the coupling to be considered hereinafter must be most accurately formed and related to each other so that all of the couplings will operate properly and uniformly, will retain their gaskets effectively, and will engage the pipes being joined effectively and accurately.

The housing 1 has a pair of hinge ears 8 and 9 extending downwardly from the outer surface of the housing adjacent the end face 10 thereof. The end face 10 lies in a diametrical plane including both end faces of the housing. As can be seen, the ears 8 and 9 extend circumferentially well past the surface 10. The housing 2 carries a center, heavier, hinge ear 11 which similarly projects downward and circumferentially from the outer surface of the housing 2 adjacent the flat end face 12 thereof and into a position to lie between the hinge ears 8 and 9. The end face 12, like the end face 10, lies in a diametrical plane extending across the open mouth of the housing 2. A hinge pin, or pintle, 13, to be more particularly considered hereinafter, is shown as extending through the ears 8, 9 and 11.

Flat faces 14 and 15 are provided at the opposite ends of the housings 1 and 2 from their flat end faces 10 and 12. The face 14 lies in the same diametrical plane as does the face 10, and the face 15 lies in the same diametrical plane as the face 12. Thus when the pairs of faces 10–12 and 14–15 are brought together and in registry, as the coupling is closed, a complete and accurate cylinder results.

At the opposite end from the hinge, the housing 1 is equipped with a toggle mounting block 16 which extends upwardly from the outer surface of the housing adjacent the face 14 and intermediate the sides of the housing, as best seen in Figure 2. The block 16 has accurately formed side faces lying in planes at right angles to the axis of the coupling and it also has a front face 17 which is a continuation of the surface 14. Similarly, the housing 2 is equipped with a toggle engaging block 18 having accurately formed side faces, aligning with the side faces of the block 16 when the coupling is closed, and a front face 19 which is a continuation of the face 15. The block 18 is also formed with a reentrant rear face 20 for the reception of the nose of the toggle as will appear hereinafter.

As already indicated, accurate and uniform construction of these housings, their hinge ears and the toggle blocks, and particularly the working surfaces of all parts, is required for the proper coupling of pipe ends in accordance with the invention. This could, of course, be achieved by machining all such surfaces once the housing blanks are formed, but costwise that would be prohibitive. Sufficiently accurate results are achieved however by forming the housings as castings and subjecting those housings to a coining operation in accurate coining dies. These dies are formed to finish the working surfaces of the castings to the high degree of accuracy desired. Thus, if the housings 1 and 2, as here shown, are placed together with their end faces in face to face relation, all the working parts of each will properly mate up and the coupling so formed will effectively and accurately engage pipe ends accurately grooved ready to receive it. In this particular instance, however, the accurate completion of the full circle by the two housings is not achieved by the hinging of the housings together, but is intentionally prevented from taking place until the toggle, about to be described, is snapped into closed position.

The toggle member 4 in accordance with the invention is provided in a unique as well as a simple and economical manner. The member 4 when assembled consists of a pair of toggle elements 21 and 22, each of which is made up of an assembly of identical toggle leaves 23. An individual one of such toggle leaves is shown per se in Figures 7 and 8. There it will be seen that such leaf is an arcuate flat strip of metal rounded at one end, 24, and reduced in width adjacent the other end into a rounded nose end 25. The leaf 23 is perforated at 26 adjacent the end 24, and at 27 adjacent the nose 25. These leaves are accurately and identically stamped from suitable metal, which, as against prior art practices, makes for greater economy in the production of toggles.

As best seen in Figure 9, the toggle element 22 is made up by assembling three of the leaves 23 in superimposed mated relationship. These are held tightly together adjacent their ends 24 by a suitable pin, or rivet, 28, passed through their openings 26. Adjacent their opposite ends they are held in alignment by a hinge pin 29 which also passes through the openings 27 of the opposed pair of leaves 23 making up the toggle element 21. The ends of the hinge pin 29 are shown as riveted over and this serves to secure the leaves 23 of the element 21 snugly against the outer surfaces of the leaves of the element 22, leaving enough play for the swinging of the toggle element 22 with respect to the element 21. Besides providing the swinging action, the pin 29 holds the leaves 23 of the element 22 snugly together and particularly the nose elements 25 thereof for strength and accuracy of the toggle operation.

From the showing in the drawing and in particular from Figure 9 thereof, it will be noted that assembly of the toggle leaves is in reverse direction so that their nose ends 25 are inward. Also, by reference to Figure 1, it will be noted that when the toggle made up of these elements is in fully closed position the elements will fall into a continuous smooth curved pattern.

The toggle element 21, adjacent its ends 24 embraces the toggle mounting block 16 and is pivoted thereto by means of a suitable pin 30 passing through the openings 26 and through an aligned opening in the block 16. From Figure 2 it will be seen that the leaves 23 of the element 21 snugly embrace the block 16. The inner faces of the leaves have substantial contact with the faces of that block so that accurate controlled pivotal movement of the toggle is assured. They have similar engagement with the side faces of the block 18 when they are swung down to embrace it. The pin 30 is shown as riveted over at its ends to hold the leaves 23 in against the sides of the block 16. Other suitable means may, of course, be employed in place of rivets.

Another feature to note is that when the three leaves making up the element 22 are assembled together their composite thickness is slightly greater than that of the blocks 16 and 18. This enables the leaves 23 of the element 21 to slide past the sides of blocks 16 and 18.

Another important feature of the invention resides in the manner in which the inherent resilience of the material of the housings is employed to produce a higher working pressure, to assure a strong toggle action and to provide a tight accurate coupling. Considering the showing in Figure 4, and the enlarged fragment thereof in Figure 6, it will be seen that the housings 1 and 2 come no closer together than the Figure 4 showing by swinging about the hinge pin 13, because in this position the surfaces 10 and 12 come into engagement across a fulcrum line 31 which thus checks further inward movement of the housings.

The showings in Figures 4 and 6 are somewhat exaggerated for the purpose of illustration. The actual relationship can best be visualized when it is understood that the fulcrum line 31 is preferably located across the outer edges of the surfaces 10 and 12. That position is not far from the axis of the hinge pin 13 as against the extent of a full diameter across the coupling from the line 31. Actually, however, the offset of the line 31 from the hinge 13 is ample to provide the resilient resistance needed for the desired effects.

The positioning of the hinge pin to establish and maintain the fulcrum at the line 31 is achieved in the following manner. A pair of coupling housings 1 and 2 is seated in a drill jig and the housings are rotated about the fulcrum line 31 to open up a small gap at the toggle side, as seen in Figure 4. The hole for the hinge pin is then drilled through the hinge ears and a properly fitting hinge pin is inserted. The axis of the hinge pin will thus serve for the swinging of the housings until they are closed to where the fulcrum 31 comes into action. Further inward movement after that must be about the line 31 and the hinge axis actually lies outside of that fulcrum line.

What has to be guarded against in couplings for grooved end pipe is the possibility that gaps may open up at such positions as between the surfaces 10 and 12, or 14 and 15. Should such gaps open up as the line pressure in the pipe increases, the key sections, such as 6 and 7, would tend to pull out of the grooves in the pipe and reduce the ability of the coupling to withstand line pressure. The toggle construction already described provides sufficient force to enable the gap between the housings to be readily closed, thus producing an accurate effective coupling.

The resilience of the material in the housings not only participates materially in conjunction with the fulcrum 31 in assuring the existence of a tight and effective toggle, but also enables the fulcrum 31 to introduce greatly improved hinge characteristics. This results from the fact that when engagement is made between the housings along the fulcrum line 31, further effort towards closing the coupling reacts on the hinge, first to eliminate lost motion from it, thus making sure that there will be no freedom at the hinge end, and next to apply a pre-stressing action on the hinge pin. This pre-stressing action on the hinge pin acts as an additional strong safety factor in precluding the opening of a gap between the faces 10 and 12 as the pipe line pressure is increased. Thus the relationship of the coupling parts in accordance with the invention strengthens the coupling action in a variety of manners.

In the Figure 4 position, the housings 1 and 2 have been swung in to where the surfaces 10 and 12 engage about the line 31. From there on the toggle must be employed to apply sufficient force to close the gap between the housings. This is done by bringing the spaced leaves 23 of the toggle element 21 down past the sides of the block 18. Then the toggle element 22 is swung about the pivot 29 bringing the nose 25 into engagement with the surface 20. Moderate hand pressure exerted upon the portion of the element 22 between the pivot 29 and the end 24 will cause the housings to be drawn together against their resilient resistance. At the time the surfaces 14—15 and 10—12 come into engagement, the toggle element 22 will have reached its dead center point. Going slightly beyond that into the Figure 1 position, the toggle element 22 snaps into locked position.

Once in its closed, or locked, position the toggle element 22 is held in position by this new factor of the resilient reaction of the housings, in addition to the usual toggle friction and the usual reaction of the compressed resilient gasket. Then, as pressure is let into the pipe line, that adds pressure within the gasket and further increases the locking action. From this it can be seen that once the toggle coupling is put into use a substantial force is required to reopen it. Thus, accidental opening of the toggle, and hence the coupling, is precluded, and no extraneous locking or securing means is needed to hold the toggle in closed position. Intentional opening of it may, however, be effected by inserting a suitable tool under the end 24 of the element 22 and prying it up.

From the foregoing it will be apparent that applicant has devised an extremely simple, economical and effective coupling employing a minimum of parts and has devised methods for forming such coupling and parts which go far beyond anything heretofore contemplated in the art. For the first time, a quickly applicable and detachable coupling has been devised, which is rugged and fool-proof in operation and will stand up indefinitely, but, nevertheless, at a cost sufficiently low that it creates a market, rather than pricing itself out of one.

It is, of course, to be appreciated that changes in the embodiment of the invention here shown and in carrying out the method of forming the same and of the parts thereof may be made without departing from the scope of the invention. It is thus intended that all matter contained in the above description or shown in the accompanying drawing shall be interpreted as illustrative and not in a limiting sense.

The invention claimed is:

1. A pipe coupling comprising a pair of mated hemi-cylindrical housings hinged together at one end of each to be swung apart for reception of pipe ends to be coupled and to be drawn toward each other for the coupling of such pipe ends, each of said housings being formed with transversely extending end faces at each end of a diameter of the cylinder thereof, the outer edges of one opposed pair of said end faces coming together to form a fulcrum line extending transversely of said faces and about which said housings swing to form a complete cylinder, and hinge means for swinging the housings toward and away from each other, said hinge means having a part secured to the outer surfaces of each of said housings adjacent said fulcrum line with the axis of said hinge means lying outwardly of said fulcrum and laterally with respect to a radius of the curvature of said housings extending to said fulcrum whereby said housings swing on their hinge to a position just short of closing, with the completion of said closing being effected by the further swinging of said housings about said fulcrum line to stress said hinge and prevent any lost motion therein.

2. A pipe coupling comprising a pair of mated hemi-cylindrical housings, hinge means extending outwardly from the outer surfaces of said housings adjacent a pair of opposed ends thereof for hinging said housings together for movement away from each other for the reception of pipe ends to be coupled and part way toward each other, the axis of said hinge means lying outwardly of said housings and said housings being formed with opposed end faces with said end faces meeting at a fulcrum line extending transversely thereof and coming into action as said housings are swung about the axis of said hinge means, said fulcrum line being spaced inwardly from the axis of said hinge for use in completing the movement of said housings toward each other, and means engaging said housings at a position opposite said hinge for drawing the same together about said fulcrum to complete a cylinder and pre-stress said hinge.

3. A pipe coupling comprising a pair of mated hemi-cylindrical elements, each of said elements being formed with transversely extending end faces at each end of the diameter of the cylinder, said elements taken together forming a complete cylinder when their respective end faces are brought into aligned engagement, hinge means for the swingable mounting of said hemi-cylindrical elements with respect to each other to swing them wide apart for the reception of pipe ends to be coupled and to swing them to a position close to a closed position for the securing of said pipe ends, said hinge means including a hinge pin and an outwardly extending projection on each of said elements adjacent an opposed pair of said end faces, said projections receiving said hinge pin, the axis of said hinge pin being located in a plane backwardly spaced with respect to one of the end faces of said pair of hemi-cylindrical elements when said elements are in open position whereby the normal inward swing of said elements about said hinge will be terminated by said end faces coming together at a transversely extending line prior to the full engagement of said end faces.

4. In toggle construction for clamping hemi-cylindrical hinged housings of a pipe coupling in closed position, a mounting block extending upwardly from one of said housing members adjacent the parting line between the same and the other member, a clamping block in alignment with said mounting block and extending upwardly from the other of said housing members adjacent said parting line, said clamping block being formed with a toggle nose engaging surface on its face remote from said parting line, a toggle arm pivotally mounted on said mounting block, said toggle arm comprising a pair of toggle elements, each of said toggle elements being formed of a plurality of toggle leaves of identical construction, one of said toggle elements being formed of a pair of said toggle leaves, said pair of toggle leaves being pivotally mounted on said mounting block, one on either side thereof, the other of said toggle elements being formed of a plurality of said leaves secured in side by side relation and pivotally mounted within the ends of said pair of toggle leaves of said one toggle element remote from said mounting block, said toggle leaves of the other of said toggle elements being formed with toggle noses for engagement with said engaging surface of said clamping block whereby an economical effective toggle construction is formed out of identical elements merely by arranging certain of them in reverse position with respect to certain others.

5. A toggle arm of the character described comprising, a pair of toggle elements, each of said toggle elements being formed of a plurality of identical toggle leaves, said toggle leaves being non-symmetrical in outline and the toggle leaves of said elements being assembled in opposed relation, the toggle leaves of one of said elements being located in side by side relation and the toggle leaves of the other of said elements receiving the toggle elements of said one of said elements therebetween in partially overlapped relation, a pivot pin extending through the overlapping portions of said toggle leaves and being formed to maintain said toggle leaves in close side by side relation, means engaging the free end of said toggle leaves of said one element together in side by side relation, and means formed in the free end of said toggle leaves and said other element for pivoting the same on to a mounting.

6. The method of imparting clamped resilience to a toggle type pipe coupling formed of a pair of hemi-cylindrical housings made out of resilient material and prestressing the hinge thereof which comprises, forming mated opposed end faces on both ends of a pair of mated hemi-cylinders, forming mated overlapping hinge ears on the outer surface of said housings adjacent one pair of mated end faces, rotating said hemi-cylinders away from each other about the juncture of the outer edges of the pair of said mated end faces adjacent said hinge ears, to divide said end faces at a small angle from said fulcrum line, clamping said housings in said diverging position, drilling through said hinge ears to provide a hinge pin receiving bore while said housings are held in said diverging position and inserting a hinge pin in said receiving bore.

References Cited in the file of this patent

UNITED STATES PATENTS

| | | |
|---|---|---|
| 1,518,479 | Brewer | Dec. 9, 1924 |
| 1,646,463 | Stokesbery | Oct. 25, 1927 |
| 2,459,251 | Stillwagon | Jan. 18, 1949 |
| 2,673,102 | Hutchinson | Mar. 23, 1954 |

FOREIGN PATENTS

| | | |
|---|---|---|
| 412,186 | Great Britain | June 19, 1934 |